United States Patent [19]
Hughes et al.

[11] 3,888,984

[45] June 10, 1975

[54] OXAZOLE AND IMIDAZOLE DERIVATIVES AS ANTIFUNGAL AGENTS

[75] Inventors: Peter Graham Hughes, Sunningdale; John Pomfret Verge, Middle Assendon, both of England

[73] Assignee: Lilly Industries Limited, London, England

[22] Filed: Feb. 8, 1974

[21] Appl. No.: 440,906

Related U.S. Application Data
[62] Division of Ser. No. 234,337, March 13, 1972, Pat. No. 3,813,401.

[52] U.S. Cl. ................ 424/270; 424/263; 426/151; 426/323
[51] Int. Cl. .......................................... H61k 27/00
[58] Field of Search ............ 424/270, 263; 426/151, 426/323

[56] References Cited
FOREIGN PATENTS OR APPLICATIONS
12,643    1964    Japan Primary Examiner—Jerome D. Goldberg
Attorney, Agent, or Firm—Kathleen R. S. Page; Everet F. Smith

[57] ABSTRACT

2-($5^1$-Nitro-$2^2$-thiazolylthio) oxazole and imidazole compounds are useful as fungicides, being active against plant pathogenic fungi, especially grey mould and downey mildew infections of fruits, and against various fungi pathogenic to animals such as Candida and dermatophytes. The compounds are prepared by condensation of a salt of the appropriate 2-mercapto-oxazole or imidazole with a 2-halo-5-nitrothiazole.

10 Claims, No Drawings

OXAZOLE AND IMIDAZOLE DERIVATIVES AS ANTIFUNGAL AGENTS

CROSS REFERENCE TO RELATED APPLICATIONS

This is a division of application Ser. No. 234,337, filed Mar. 13, 1972, which has matured into U.S. Pat. No. 3,813,401, issued May 28, 1974.

This invention relates to oxazole and imidazole derivatives which are useful as fungicides. The invention also provides fungicidal compositions comprising said derivatives and a process by which these derivatives and said compositions may be prepared.

According to the present invention, there are provided compounds of the formula:

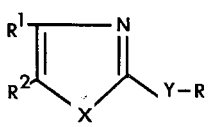

I where R is a 5-nitrothiazol-2-yl group; Y is sulphur or a sulphonyl group; X is oxygen or $NR^3$; $R^3$ is hydrogen, $C_{1-4}$ alkyl, $C_{1-4}$ hydroxyalkyl, $C_{2-4}$ alkenyl, phenyl or phenyl-$C_{1-4}$ alkyl; and $R^1$ and $R^2$ are individually selected from hydrogen, $C_{1-4}$ alkyl and phenyl, or $R^1$ and $R^2$ together form a —CH=CH—CH=$R^4$—chain, where $R^4$ is =CH— or =N—.

The term "$C_{1-4}$ alkyl" as used herein means straight and branched hydrocarbon chains having from one to four carbons such as methyl, ethyl, isopropyl, n-butyl, isobutyl and t-butyl.

The terms "$C_{1-4}$ hydroxyalkyl" and "phenyl-$C_{1-4}$ alkyl" mean the aforementioned $C_{1-4}$ alkyl groups substituted respectively by a hydroxyl or phenyl group. Examples of such substituted alkyl groups are hydroxymethyl, 2-hydroxyethyl, 3-hydroxypropyl, 1-methyl-2-hydroxyethyl, 3-hydroxybutyl, 1-methyl-3-hydroxypropyl, benzyl, phenethyl, phenopropyl, 2-methyl-2-phenylethyl and phenobutyl.

The term "$C_{2-4}$ alkenyl" means a straight or branched hydrocarbon chain containing two to four carbons and being unsaturated by a double bond, exemplary of which are vinyl, prop-1-enyl, allyl, but-1-enyl, 1-methylallyl, and but-3-enyl.

A preferred group of compounds of formula I are those where X is oxygen or $NR^3$, $R^3$ being hydrogen, methyl, ethyl, vinyl, allyl, phenyl or benzyl, and Y, R, $R^1$ and $R^2$ are as defined above. Most advantageously X is oxygen, and $R^1$ and $R^2$ individually represent hydrogen, methyl, ethyl, or phenyl, or $R^1$ and $R^2$ together represent a —CH=CH—CH=CH— chain.

The compounds of formula I may readily be prepared by condensing a 2-halo-5-nitrothiazole, preferably 2-bromo-5-nitrothiazole, with a salt of a mercapto compound of formula:

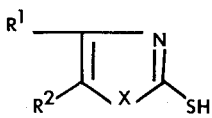

II wherein $R^1$, $R^2$ and X are as defined above, the salt if desired being produced in situ by carrying out the condensation in the presence of a base. Suitablee salts of the mercapto compound are alkali metal, alkaline earth metal and tertiary amine salts, especially the sodium and pyridinium salts, whilst suitable bases include alkali metal hydroxides, carbonates, bicarbonates and alkoxides, alkaline earth metal hydroxides and tertiary amines, especially sodium hydroxide, sodium methoxide, sodium ethoxide and pyridine. The reaction is preferably carried out in a suitable solvent or mixture of solvents such as acetone, methanol, ethanol and pyridine and proceeds at room temperature although, in order to shorten the reaction time, elevated temperatures of from 45°C. up to the reflux temperature of the reaction mixture are preferred.

The sulphones of formula I are prepared by conventional oxidation of the corresponding sulphides, for example, using a peracid or salt thereof such as peracetic acid, sodium periodate or m-chlorobenzoic acid.

As examples of compounds of formula I which may be produced by the foregoing process, there may be given:

2-(5¹-nitro-2¹-thiazolylthio)-5-phenyloxazole
2-(5¹-nitro-2¹-thiazolylsulphonyl)-5-phenyloxazole
2-(5¹-nitro-2¹-thiazolylsulphonyl)-4-methyloxazole
2-(5¹-nitro-2¹-thiazolylsulphonyl)-4-isopropyloxazole
2-(5¹-nitro-2¹-thiazolylthio)-4-ethyloxazole
2-(5¹-nitro-2¹-thiazolylthio)-4-methyloxazole
2-(5¹-nitro-2¹-thiazolylthio)-4,5-dimethyloxazole
2-(5¹-nitro-2¹-thiazolylsulphonyl)-4,5-dimethyloxazole
2-(5¹-nitro-2¹-thiazolylsulphonyl)-5-t-butyloxazole
2-(5¹-nitro-2¹-thiazolylthio)-5-t-butyloxazole
2-(5¹-nitro-2¹-thiazolylthio)-4,5-diphenyloxazole
2-(5¹-nitro-2¹-thiazolylthio) benzoxazole
2-(5¹-nitro-2¹-thiazolylthio)-4-azabenzoxazole
2-(5¹-nitro-2¹-thiazolylthio)imidazole
2-(5¹-nitro-2¹-thiazolylthio)-1-methylimidazole
2-(5¹-nitro-2¹-thiazolylthio)-1-vinylimidazole
2-(5¹-nitro-2¹-thiazolylsulphonyl)-1-methylimidazole
2-(5¹-nitro-2¹-thiazolylsulphonyl)-1-allylimidazole
2-(5¹-nitro-2¹-thiazolylthio)-1-(β-hydroxyethyl)imidazole
2-(5¹-nitro-2¹-thiazolylthio)-1-phenylimidazole
2-(5¹-nitro-2¹-thiazolylthio)-1-phenethylimidazole
2-(5¹-nitro-2¹-thiazolylsulphonyl)-1-benzylimidazole
2-(5¹-nitro-2¹-thiazolylthio)-1-benzylimidazole
2-(5¹-nitro-2¹-thiazolylthio)-1,4,5-trimethylimidazole
2-(5¹-nitro-2¹-thiazolylthio)-1-methyl-4-phenylimidazole
2-(5¹-nitro-2¹-thiazolylthio)benzimidazole
2-(5¹-nitro-2¹-thiazolylthio)-4-azabenzimidazole
2-(5¹-nitro-2¹-thiazolylthio)-7-azabenzimidazole
2-(5¹-nitro-2¹-thiazolylsulphonyl)benzimidazole The appropriate mercapto compounds of formula II, which are reacted with a 2-halo-5-nitrothiazole to form the above compounds, are for the most part known compounds. Any that are not are prepared by methods analogous to those used for preparing the known mercapto intermediate compounds. Full details of appropriate methods for preparing these mercapto intermediates can readily be obtained from standard chemical text books such as "Heterocyclic Compounds" published by John Wiley and Sons, "The Chemistry of Heterocyclic Compounds" published by Interscience, and "Advances in Heterocyclic Chemistry" published by Academic Press.

As stated above, the compounds of this invention are useful as fungicides. They show useful activity against a variety of fungi which attack economically valuable plant life and particularly are useful in the treatment of grey mould and downey mildew infections of fruits, especially grapes, in which treatment they may be used to eradicate or control such infections as well as to prevent the establishment of the disease. The compounds also possess useful activity against various fungi pathogenic to animals, including humans, such as fungi in the genus Candida, especially C. albicans, and dermatophytes such as *Trichophyton mentagrophytes*.

Accordingly the present invention in a further aspect provides a method of treating plants susceptible to or suffering from fungal attack, and particularly a method of treating fruits such as grapes susceptible to grey mould and downey mildew infections, which comprises applying to said plants or fruits a fungicidal amount of a compound of formula I. The compounds may be applied to the foliage of the plants, and/or to the soil or water in which the plants are growing, and the compounds will normally be applied in the form of fungicidal compositions. According therefore to another aspect of the present invention, there is provided a fungicidal composition comprising the active ingredient in association with a non-phytotoxic diluent or carrier material and a process for preparing such fungicidal compositions comprising mixing a fungicidally-active ingredient of formula I with said diluent or carrier material. The latter may be, for example, one or more of water, alcohols, glycols, glycol-ethers, petroleum distillates and various dispersion media such as surfactants, emulsifiers and finely divided inert solids. The concentration of the active ingredient in these compositions will vary depending on whether the composition is to be used directly as a dust or is intended as an emulsifiable concentrate or wettable powder designed to be subsequently diluted for example with water prior to use.

Since in use the compounds will normally be applied to infected or susceptible plants as compositions containing from about 5 to 3,000 p.p.m., preferably from about 200 to 2,000 p.p.m., of the active ingredient, it is normally convenient for case of formulation, storage, package, etc., to formulate the active ingredient as a liquid or solid concentrate composition.

Liquid concentrates may be prepared by dissolving, dispersing or suspending from 0.1 to 50 percent of the active ingredient in water or a suitable water-miscible solvent such as, for example, suitable aromatic, aliphatic or cyclo-aliphatic hydrocarbons, ketones or alcohols to which may be added an emulsifying agent, for example a nonionic or ionic type or blend such as condensation products or alkylene oxides with phenols and organic acids, polyoxyethylene derivatives of sorbitan esters, complex ether-alcohols and the like.

Solid concentrate mixtures may be prepared by incorporating from 5 to 90 percent of the active ingredient in a finely divided solid carrier such as bentonite, fuller's earth, diatomaceous earth, hydrated silica, diatomaceous silica, kaolin, expanded mica, attapulgite, talc, chalk and the like. Such concentrates may be formulated for direct use or may, if desired, be diluted with additional inert solid carriers to produce dusting powders. Alternatively dispersing and/or wetting agents may be incorporated to form wettable powder concentrates which subsequently may be dispersed in water or in other aqueous carriers to form spray compositions. Suitable wetting and emulsifying agents include sodium lauryl sulphate, sodium lignosulphate and other suitable nonionic and anionic surfactants or blends thereof.

The active ingredient of the invention may also be incorporated in tablets, pellets, capsules or formulated as aerosols or sprays to ensure that the fungicidal action can be obtained at the locus of the disease.

The present invention also provides a method of treating fungal infections in animals which comprises applying to the locus of the fungus or administering to the animal suffering from the fungal infection an effective dose of an active ingredient of formula I. To administer or apply the active ingredient, it will normally be necessary to present the active compound of formula I in the form of a pharmaceutical compositions comprising the active ingredient in association with a pharmaceutically acceptable diluent or carrier therefor. Such pharmaceutical compositions also form a part of this invention. The type of composition will of course depend on the proposed mode of use. Thus, for internal administration to animals, including humans, the compositions will include tablets, capsules, powders, suppositories, suspensions and injection solutions. Such compositions will normally contain from 5 to 1000 mg. of the active ingredient and will be administered in such a way as to provide the subject requiring treatment with from 0.1 to 30 mg./kg. per day. For external use, the compositions may be in the form of creams, ointments, tinctures and emulsions which will normally contain, in concentrate form, from 0.5 to 50 percent by weight of the active ingredient. It will, of course, readily be understood that the amount of active ingredient actually to be administered will be determined by a physician in the light of all the relevant circumstances including the condition of the patient who is to be treated, the infection being suffered and the route of administration. Accordingly, the above preferred dosage range is not intended to limit the scope of the present invention in any way.

The formulations of the present invention normally will consist of at least one compound of formula I mixed with a carrier, or diluted by a carrier, or enclosed or encapsulated by an ingestible carrier in the form of a capsule, sachet, cachet, paper or other container or by a disposable container such as an ampoule. A carrier or diluent may be a solid, semisolid or liquid material, which serves as a vehicle, excipient or medium for the active therapeutic substance.

Some examples of the diluents or carriers which may be employed in the pharmaceutical compositions of the present invention are lactose, dextrose, sucrose, sorbitol, mannitol, propylene glycol, liquid paraffin, white soft paraffin, kaolin, microcrystalline cellulose, calcium silicate, silica polyvinylpyrrolidone, cetostearyl alcohol, starch, gum acacia, calcium phosphate, cocoa butter, oil of theobroma, arachis oil, alginates, tragacanth, gelatin, syrup B.P., methyl cellulose, polyoxyethylene sorbitan monolaurate, ethyl lactate, methyl- and propylhydroxybenzoate, sorbitan trioleate, sorbitan sesquioleate and oleyl alcohol.

The following Examples will further illustrate the preparation of the compounds of this invention:

EXAMPLE 1

Pyridine (0.03 mole) was added to a solution in acetone (25 ml.) of 2-mercapto-4-methyloxazole (0.03 mole)- prepared by reaction of hydroxyacetone with potassium thiocyanate and hydrochloric acid. The mixture was stirred at room temperature and 5-nitro-2-bromothiazole (0.03 mole) in acetone (25 ml.) was added dropwise over a period of three minutes. After the addition, the mixture was refluxed for one hour, cooled and poured into ice/water (400 ml.). After stirring for one hour, the precipitate was collected, washed with water, dried and recrystallised from carbon tetrachloride to yield 2-($5^1$-nitro-$2^1$-thiazolylthio)-4-methyloxazole, m.p. 62°–3°C. Similarly, the corresponding 4-ethyl- and 4-isopropyl-oxazoles were prepared and each gave satisfactory microanalytical results.

The 4-methyl, 4-ethyl and 4-isopropyl compounds were converted to the corresponding sulphones as follows:

The 2-($5^1$-nitro-$2^1$-thiazolylthio)-4-substituted oxazole (0.008 mole) was dissolved in glacial acetic acid (30 mls.) and a 30 percent solution of hydrogen peroxide (5 ml) was added. The mixture was heated at 70°C until thin layer chromatography showed the absence of starting material (approximately three hours). Evaporation of the acetic acid in vacuo, followed by addition of water, precipitated the desired product which was stirred overnight in water, collected and dried to yield the desired 2-($5^1$-nitro-$2^1$-thiazolylsulphonyl)-4-substituted oxazoles the structures being confirmed by microanalysis.

EXAMPLE 2

2-Mercapto-5-phenyloxazole (0.02 mole)- prepared by treatment of α-aminoacetophenone with carbon disulphide in the presence of sodium carbonate-was dissolved in methanol (25 ml.) and sodium (0.02 mole) in methanol (10 ml.) was added. The mixture was stirred at room temperature and a solution of 5-nitro-2-bromothiazole (0.02 mole) in acetone (15 ml) was added dropwise over a period of two minutes. The reaction mixture was heated to 50°C and then stirred for 1 hour at room temperature. The reaction mixture was poured into ice/water (400 ml.) and worked up as described in Example 1 to yield 2-($5^1$-nitro-$2^1$-thiazolylthio)-5-phenyloxazole, m.p. 165°–7°C., which gave satisfactory microanalytical results as did the corresponding 5-methyl- and 5-t-butyl compounds also prepared by the above method. These oxazoles are converted to the corresponding sulphones by the method described in Example 1.

EXAMPLE 3

By the method of Example 2 but reacting 2-mercapto-4,5-dimethyloxazole-prepared by reaction of acetoin with potassium thiocyanate and hydrochloric acid - with 5-nitro-2-bromothiazole, there was obtained 2-($5^1$-nitro-$2^1$-thiazolylthio)-4,5-dimethyloxazole, m.p. 103°–4°C.

EXAMPLE 4

By the method of Example 1 but reacting 2-mercapto-1-methylimidazole-prepared by heating the diethyl acetal of aminoacetaldehyde with methyl isothiocyanate-with 5-nitro-2-bromothiazole, there was obtained 2-($5^1$-nitro-$2^1$-thiazolylthio)-1-methylimidazole, m.p. 105°–7°C.

EXAMPLE 5

Using the methods described in Examples 1 to 4, the following compounds were prepared from the corresponding known mercapto intermediates:

2-($5^1$-nitro-$2^1$-thiazolylthio) benzoxazole, m.p. 122°–3°C.

2-($5^1$-nitro-$2^1$-thiazolylthio) benzimidazole, m.p. 162°–4°C.

2-($5^1$-nitro-$2^1$-thiazolylthio)-4-azabenzimidazole, m.p. 187°–9°C.

The following Examples illustrate the fungicidal compositions of the present invention:

EXAMPLE 6

| | % by Weight |
|---|---|
| 2-($5^1$-nitro-$2^1$-thiazolylthio)-4-methyloxazole | 40 |
| Sodium lauryl sulphate | 8 |
| Isooctyl phenyl polyethoxyethanol | 6 |
| China clay | 46 |

The above ingredients were mixed to form a wettable powder concentrate. In use, this concentrate is diluted with water to form a spray composition containing from 300 to 600 p.p.m. of active ingredient.

EXAMPLE 7

An emulsifiable concentrate containing the following ingredients was prepared:

| | % by Weight |
|---|---|
| 2-($5^1$-nitro-$2^1$-thiazolylthio) benzoxazole | 20 |
| Sodium alkyl aryl sulphonate blend | 7 |
| Polyoxyethylene sorbitan monolaurate | 5 |
| Xylene | 68 |

This concentrate is diluted prior to use with water to form a sprayable emulsion containing from 200 to 400 p.p.m. of active ingredient.

EXAMPLE 8

An emulsifiable concentrate having the following ingredients was prepared:

| | % by Weight |
|---|---|
| 2-($5^1$-nitro-$2^1$-thiazolylthio)-4,5-dimethyloxazole | 40 |
| Mixture of anionic and nonionic emulsifiers | 16 |
| Acetone | 44 |

This concentrate is diluted prior to use with water to form a sprayable composition containing from 400 to 800 p.p.m. of active ingredient.

EXAMPLE 9

A wettable powder concentrate was prepared by mixing the following ingredients:

| | % by Weight |
|---|---|
| 2-($5^1$-nitro-$2^1$-thiazolylthio) benzimidazole | 80 |
| Anionic surfactant | 10 |
| Kaolin | 10 |

In use, this powder is dispersed in water to form a composition containing from 600 to 1000 p.p.m. of active ingredient.

The following Examples illustrate pharmaceutical compositions containing as active ingredient a compound of formula 1:

EXAMPLE 10

A washable ointment having the following composition was prepared:

| | |
|---|---|
| 2-(5¹-nitro-2¹-thiazolylthio) benzoxazole | 1.0 g. |
| Polyethylene glycol 400 | 50.0 g. |
| Polyethylene glycol 4000 | 49.0 g. |

The polyethylene glycol 4000 was heated until molten and the polyethylene glycol 400 added with stirring to give a homogenous mixture. Into this, the active ingredient was incorporated and the mixture stirred until cool.

EXAMPLE 11

A dusting powder was prepared as follows:

| | |
|---|---|
| 2-(5¹-nitro-2¹-thiazolylthio)-4-methyloxazole | 0.5 g. |
| Magnesium carbonate | 5.0 g. |
| Calcium carbonate | 10.0 g. |
| Zinc oxide | 5.0 g. |
| Talc | to 100.0 g. |

The active ingredient was triturated with the calcium carbonate and the magnesium carbonate and zinc oxide added with thorough mixing. The talc was then added and, after being well mixed, the resultant powder was sieved through a 60 mesh British Standard sieve.

EXAMPLE 12

A cream containing the following components was prepared:

| | |
|---|---|
| 2-(5¹-nitro-2¹-thiazolylthio)-4-methyloxazole | 2.0 g. |
| Cetostearyl alcohol | 8.5 g. |
| Sodium lauryl sulphate | 0.9 g. |
| White soft paraffin | 15.0 g. |
| Liquid paraffin | 6.0 g. |
| Distilled water | to 100.0 g. |

The cetostearyl alcohol and sodium lauryl sulphate were heated together to 70°C. The paraffins were added and the mixture stirred until homogenous, the temperature being maintained at about 55°C. The active ingredient was incorporated into the oily mixture and then water at the same temperature was added slowly with constant stirring which was continued until the resultant cream was cold.

EXAMPLE 13

Tablets having the following ingredients were prepared:

| | Per Tablet |
|---|---|
| 2-(5¹-nitro-2¹-thiazolylthio) benzoxazole | 100 mg. |
| Starch | 50 mg. |
| Lactose | 35 mg. |
| Ethyl cellulose (as 20% solution in industrial alcohol) | 3 mg. |
| Alginic acid | 8 mg. |
| Magnesium stearate | 2 mg. |
| Talc | 2 mg. |
| | 200 mg. |

The active ingredient, starch and lactose were thoroughly mixed and the solution of ethyl cellulose added. The resultant powder was sieved through a No. 12 British Standard screen. The granules produced were dried, the remaining ingredients added and, afte thorough mixing, the mixture was compressed into tablets each containing 100 mg. of active ingredient.

EXAMPLE 14

Capsules having the following ingredients were prepared:

| | Per Capsule |
|---|---|
| 2-(5¹-nitro-2¹-thiazolylthio) benzoxazole | 250 mg. |
| Lactose | 48 mg. |
| Magnesium stearate | 2 mg |

The ingredients were thoroughly mixed, sieved through a No. 44 British Standard screen and filled into hard gelatin capsules in 250 mg. quantities.

We claim:

1. Fungicidal composition comprising as an active ingredient a fungicidally effective amount of a compound of the formula wherein Y is sulphur or a sulphonyl group; X is oxygen or $-NR^3$; $R^3$ is selected from hydrogen, $C_{1-4}$ alkyl, $C_{1-4}$ hydroxyalkyl, $C_{2-4}$ alkenyl, phenyl and phenyl-$C_{1-4}$ alkyl; and $R^1$ and $R^2$ are individually selected from hydrogen, $C_{1-4}$ alkyl and phenyl, or $R^1$ and $R^2$ together form a $-CH=CH-CH=CH=R^4-$ chain wherein $R^4$ is $=CH-$ or $=N-$, in association with a non-phytotoxic carrier or diluent therefor.

2. Composition according to claim 1, in the form of a liquid concentrate containing from 0.1 to 50 percent by weight of said active ingredient.

3. Composition according to claim 1, in the form of a solid concentrate containing from 5 to 90 percent of said active ingredient.

4. Composition according to claim 1, wherein said active ingredient is selected from 2-(5¹-nitro-2¹-thiazolylthio)-4-methyloxazole, 2-(5¹-nitro-2¹-thiazolylthio)-4,5-dimethyloxazole and 2-(5¹-nitro-2¹-thiazolylthio) benzoxazole.

5. Method of treating fruits susceptible to or suffering from grey mould or downey mildew infections, which comprises applying to said fruits a fungicidal amount of a compound of the formula

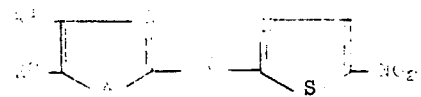

wherein Y is sulphur or a sulphonyl group; X is oxygen or $-NR^3$; $R^3$ is selected from hydrogen, $C_{1-4}$ alkyl, $C_{1-4}$ hydroxyalkyl, $C_{2-4}$ alkenyl, phenyl and phenyl-$C_{1-4}$ alkyl; and $R^1$ and $R^2$ are individually selected from hydrogen, $C_{1-4}$ alkyl and phenyl, or $R^1$ and $R^2$ together form a $-CH=CH-CH=R^4-$ chain wherein $R^4$ is $=CH-$ or $=N-$.

6. Method according to claim 5, wherein said compound is applied in the form of a fungicidal composition containing from about 5 to 3000 p.p.m. of said compound in association with a non-phytotoxic diluent or carrier therefor.

7. Pharmaceutical composition adapted for internal administration to animals suffering from fungal infection containing from about 5 to 1000 mg. of a compound of the formula

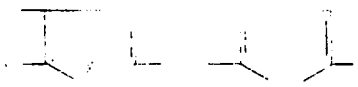

wherein Y is sulphur or a sulfonyl group; X is oxygen or -NR³; R³ is selected from hydrogen, $C_{1-4}$ alkyl, $C_{1-4}$ hydroxyalkyl, $C_{2-4}$ alkenyl, phenyl and phenyl-$C_{1-4}$ alkyl; and R¹ and R² are individually selected from hydrogen, $C_{1-4}$ alkyl and phenyl, or R¹ and R² together form a —CH=CH—CH=R⁴— chain wherein R⁴ is =CH— or =N—, in association with a pharmaceutically acceptable diluent or carrier therefor.

8. Pharmaceutical composition adapted for external application to animals suffering from fungal infection containing from about 0.5 to 50 percent by weight of a compound of the formula

wherein Y is sulphur or a sulphonyl group; X is oxygen or —NR³; R³ is selected from hydrogen, $C_{1-4}$ alkyl, $C_{1-4}$ hydroxyalkyl, $C_{2-4}$ alkenyl, phenyl and phenyl-$C_{1-4}$ alkyl; and R¹ and R² are individually selected from hydrogen, $C_{1-4}$ alkyl and phenyl, or R¹ and R² together form a —CH=CH—CH=R⁴— chain wherein R⁴ is =CH— or =N—, in association with a pharmaceutically acceptable diluent or carrier therefor.

9. Method of treating fungal infections in animals which comprises administering to the animal suffering from the fungal infection a fungicidally effective dose of a compound of the formula

wherein Y is sulphur or a sulphonyl group; X is oxygen or —NR³; R³ is selected from hydrogen, $C_{1-4}$ alkyl, $C_{1-4}$ hydroxyalkyl, $C_{2-4}$ alkenyl, phenyl and phenyl-$C_{1-4}$ alkyl; and R¹ and R² are individually selected from hydrogen, $C_{1-4}$ alkyl and phenyl, or R¹ and R² together form a —CH=CH—CH=R⁴— chain wherein R⁴ is =CH— or =N—.

10. Method according to claim 9, wherein from about 0.1 to 30 mg./Kg. per day of said compound is administered.

* * * * *

UNITED STATES PATENT OFFICE
CERTIFICATE OF CORRECTION

PATENT NO. : 3,888,984
DATED : June 10, 1975
INVENTOR(S) : Peter Graham Hughes, John Pomfret Verge It is certified that error appears in the above-identified patent and that said Letters Patent are hereby corrected as shown below:

In column 2, line 3, "Suitablee" should read --Suitable--.

Line 20, "m-chlorobenzoic acid" should read -- m-chloroperbenzoic acid --.

In claims 1, 5, 7, 8, and 9, the formula in each instance is the same and should read

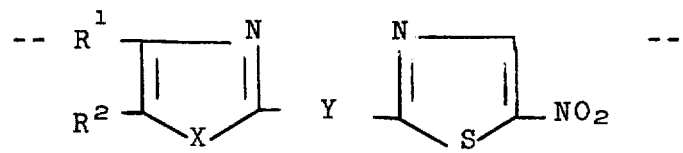

Signed and Sealed this

Thirty-first Day of August 1976

[SEAL]

Attest:

RUTH C. MASON
Attesting Officer

C. MARSHALL DANN
Commissioner of Patents and Trademarks